(12) United States Patent
Krimpmann

(10) Patent No.: US 9,156,633 B2
(45) Date of Patent: Oct. 13, 2015

(54) MANIPULATOR FOR FLAT OBJECTS

(71) Applicant: Manfred Krimpmann, Erndtebrueck-Zinse (DE)

(72) Inventor: Manfred Krimpmann, Erndtebrueck-Zinse (DE)

(73) Assignee: ALPHA-TEC KRIMPMANN GMBH, Ludwigsburg (DE)

( * ) Notice: Subject to any disclaimer, the term of this patent is extended or adjusted under 35 U.S.C. 154(b) by 107 days.

(21) Appl. No.: 14/028,602

(22) Filed: Sep. 17, 2013

(65) Prior Publication Data

US 2014/0079525 A1    Mar. 20, 2014

(30) Foreign Application Priority Data

Sep. 19, 2012 (DE) .................. 10 2012 018 438

(51) Int. Cl.
| B65G 59/04 | (2006.01) |
| B65G 61/00 | (2006.01) |
| B25J 15/06 | (2006.01) |
| B65H 3/08  | (2006.01) |

(52) U.S. Cl.
CPC ............. *B65G 59/04* (2013.01); *B25J 15/0616* (2013.01); *B65G 61/00* (2013.01); *B65H 3/0816* (2013.01); *Y10S 414/125* (2013.01)

(58) Field of Classification Search
CPC ............. B65H 2220/01; B65H 3/0816; E04F 21/1822; E04F 21/1888; E04F 21/1844; Y10T 29/49943; Y10T 29/5377; B25J 15/00; B29C 2045/7633; B65G 47/90; B65G 47/91; B65G 57/04; Y10S 414/114
USPC .............. 221/211, 242, 46, 69; 271/121, 124, 271/161; 29/809; 294/2; 414/10–12, 622, 414/789.9, 790.2, 793, 797, 795.8, 796, 414/796.2, 796.5, 796.9, 797.1, 797.7, 414/797.8, 799, 912; 72/424; 901/40
See application file for complete search history.

(56) References Cited

U.S. PATENT DOCUMENTS

| 4,168,772 A * | 9/1979 | Eberle .................. 198/418.3 |
| 4,678,175 A * | 7/1987 | Arldt et al. .................. 271/34 |
| 4,690,317 A * | 9/1987 | Hamisch et al. ............ 227/67 |
| 5,330,311 A * | 7/1994 | Cawley et al. ........... 414/416.01 |
| 5,472,184 A * | 12/1995 | Focke et al. ................ 271/11 |
| 5,863,169 A * | 1/1999 | Inkeroinen ................. 414/11 |
| 5,941,681 A * | 8/1999 | Piotrowski et al. ........ 414/797.8 |
| 6,468,025 B1 * | 10/2002 | Stumpf et al. .............. 414/797 |
| 6,823,791 B1 * | 11/2004 | Richardson et al. ........ 101/477 |
| 7,381,026 B1 * | 6/2008 | Power et al. ............. 414/795.6 |
| 7,729,796 B2 * | 6/2010 | Hartrampf et al. ........... 700/175 |

FOREIGN PATENT DOCUMENTS

| DE | 209422 B       | 5/1984 |
| DE | 229664 B       | 11/1985 |
| DE | 202006018017 U | 4/2007 |
| DE | 102006023298 B | 11/2007 |
| DE | 102006060361 A | 6/2008 |
| DE | 202007006528 U | 10/2008 |

* cited by examiner

*Primary Examiner* — Gregory Adams
(74) *Attorney, Agent, or Firm* — Andrew Wilford

(57) ABSTRACT

A manipulator for flat objects has a robot arm having an outer end, a support on the outer end, and a magazine holding a stack of the flat objects carried on the support. A grab is movable on the support adjacent the magazine between a pickup position facing the stack and engageable with an uppermost flat object of the stack of flat objects in the magazine so as to pull the uppermost flat object off the stack and a transfer position offset from the stack with the picked-up flat object turned away from the magazine.

16 Claims, 6 Drawing Sheets

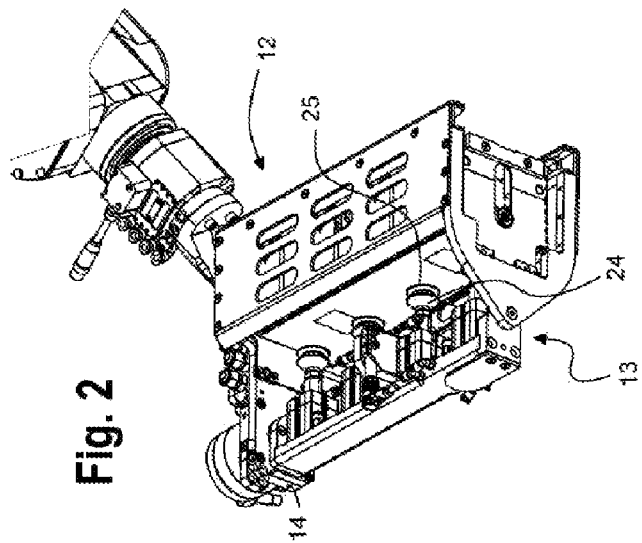
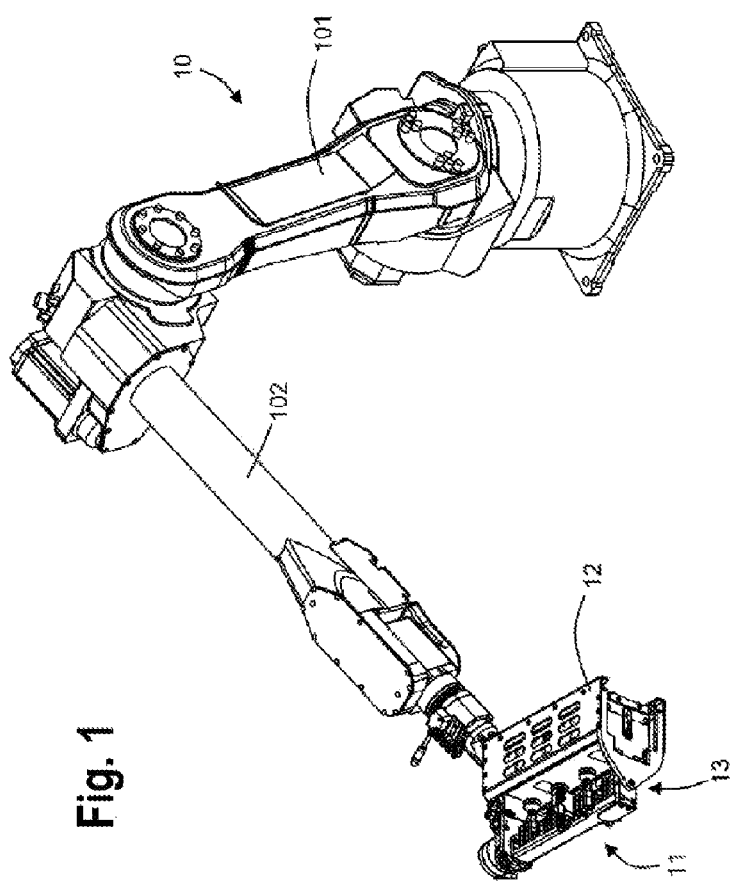

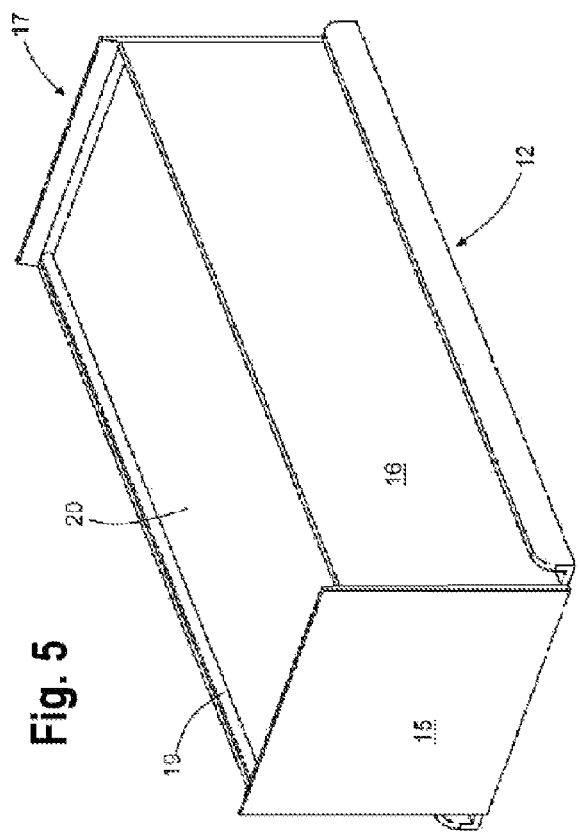
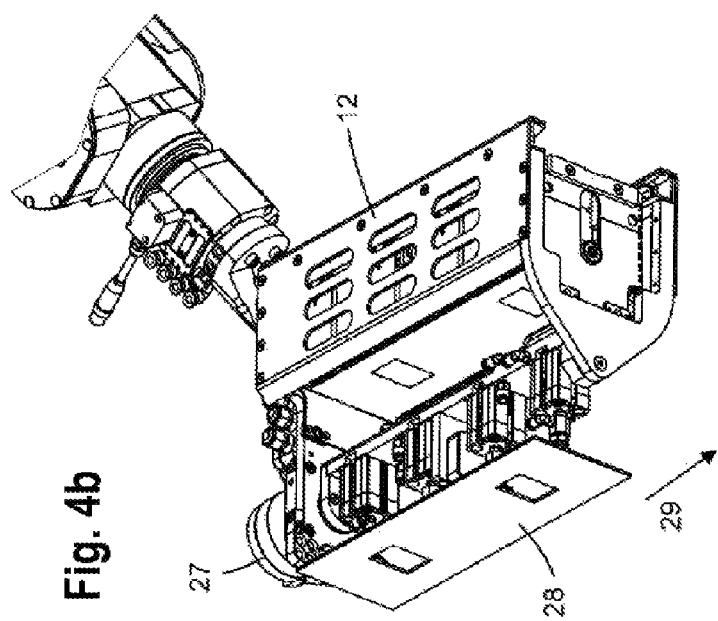

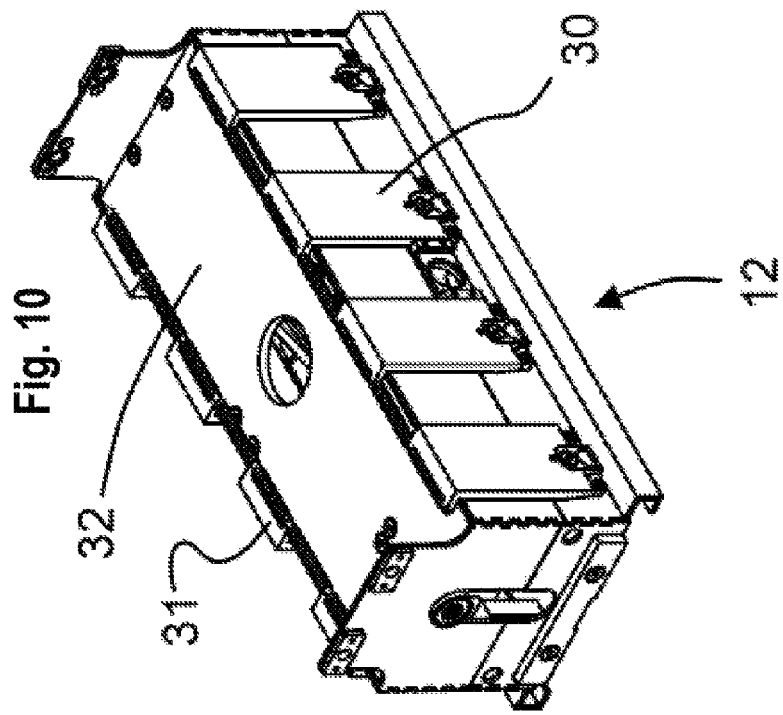
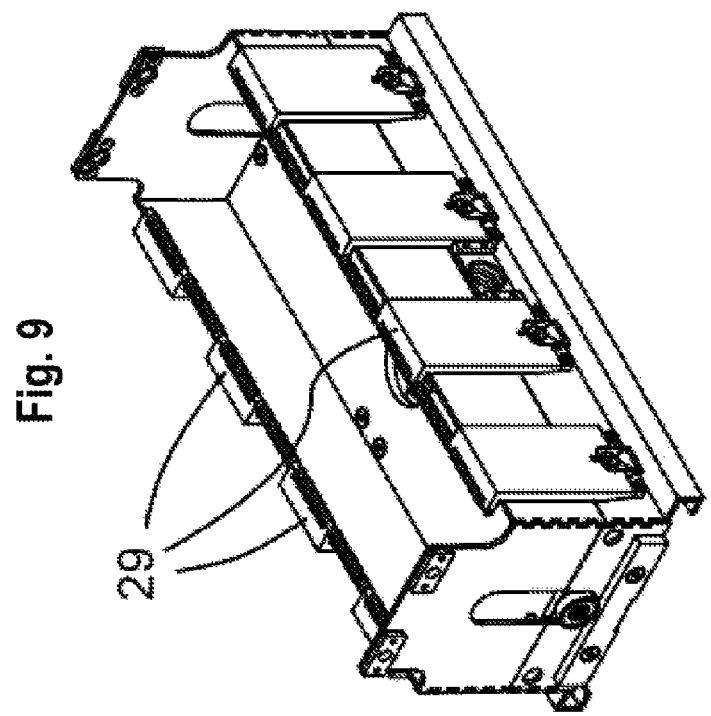

MANIPULATOR FOR FLAT OBJECTS

FIELD OF THE INVENTION

The present invention relates to a manipulator. More particularly this invention concerns a manipulator having a grab and a magazine for small objects.

BACKGROUND OF THE INVENTION

A manipulator is known for handling flat objects like small metal, glass, or plastic-film sheets and having a magazine for holding a stack of the objects and a grab for removing them one at a time from the stack in the magazine and putting them in position on something.

Such an apparatus having a plurality of actuator cylinders and rubber suction heads that are lowered onto a flat object and, after suction has been applied, lift the flat object and transfer it to the desired location are known in particular in the field of stackers, in particular of stacked layers between which intermediate layers have to be deposited. See, for example, DD 229 664.

German patent DE 10 2006 023 298 discloses a method and an apparatus for lifting a topmost plastic sheet from a stack of sheets with suction heads. The suction heads are applied to the topmost sheet, vacuum is applied, and the topmost sheet is lifted off the stack.

DE 10 2006 060 361 discloses a conveying electrostatic gripper and a method for conveying a single flexible sheet from a support surface to a target form. A rolling body of the conveying gripper has a deactivatable attracting unit that pulls the sheet-like material toward a rolling surface of the rolling body. The sheet-like material taken up in this way is unrolled over the target form, the attracting unit being electrostatically deactivated in the region of the rolling body engaging the target form. To this end, an annular array of electrodes on the rolling gripper are activatable and/or deactivatable individually and independently of one another.

Similar displacing apparatuses for the insertion of intermediate layers in the automatic palletizing of piece goods are disclosed in DD 209 422 and DE 20 2006 018 017.

DE 20 2007 006 528 discloses a manipulator for flat objects. It has one or more manipulators that have each a multi-axial grab with a tool for taking up and releasing at least one flat object and having at least one rotatable material support that is configured as a winding former or as a flat object carrier for a plurality of flat objects. An articulated-arm robot, in particular having a robotic hand that is rotatable about multiple axes, is proposed as the grab. In one preferred embodiment, the handling tool has a movable turret for receiving and positioning a plurality of workpiece supports configured as winding formers for the winding and unwinding of at least one flat object. Suction units for fastening the web-like winding materials are provided on the workpiece support. Owing to the turret-like workpiece support, this apparatus is of a correspondingly voluminous construction if a plurality of flat objects are to be secured to its outer surface. It is, however, less suitable for two-dimensional flat objects.

Cavities of refrigerators, washing machines, dishwashers, or motor vehicles, are typically fitted with insulation mats to suppress sound created by vibration that is inevitable in the operation of such machines or vehicles. However, in the case of motor vehicles the particular problem arises that the insulation mats, which are to be adhesively bonded to walls that are correspondingly vibration-prone, are relatively large and can only be introduced with difficulty through existing window or door openings. Therefore, for a long time the adhesive bonding of the insulation mats has been carried out exclusively by hand. Automating this operation proves to be difficult on account of the required logistical effort and the required flexibility to produce different variants, the time periods for loading a multi-part gripper and also the required size of a robotic gripper. In many cases, the spatial conditions alone at the manual insertion stations do not permit automation. As a fallback solution, systems known as insulating compound injectors, which make the flexible, type-specific application of the insulation material under robot control possible, have been developed. Disadvantages are the high material input costs that are based on the raw materials and the high cost for service and maintenance of the robot-guided injectors.

OBJECTS OF THE INVENTION

It is therefore an object of the present invention to provide an improved manipulator for flat objects.

Another object is the provision of such an improved manipulator for flat objects that overcomes the above-given disadvantages, in particular that makes faster handling possible, is constructed in a compact manner and, in particular in the automotive industry, makes automated manufacture with respect to the installation of insulation mats possible.

SUMMARY OF THE INVENTION

A manipulator for flat objects has according to the invention a robot arm having an outer end, a support on the outer end, and a magazine holding a stack of the flat objects carried on the support. A grab is movable on the support adjacent the magazine between a pickup position facing the stack and engageable with an uppermost flat object of the stack of flat objects in the magazine so as to pull the uppermost flat object off the stack and a transfer position offset from the stack with the picked-up flat object turned away from the magazine.

Thus the system of this invention is characterized in that the manipulator has on its head a gripping unit and a magazine. This arrangement has significant advantages. First, the time-consuming conveying of the individual flat objects from a remote magazine to the destination is dispensed with, since a sufficient reserve of, for example, insulation mats for one motor vehicle or one washing machine is located next to the gripper on the grab head. Without having to cover long paths, the gripping unit can thus remove a flat object, if applicable process it, and subsequently transfer it to the destination and immediately thereafter remove the next piece from the magazine. Any reverse-pivoting of the gripper out of the cavity of the vehicle or other machine is dispensed with. The magazine, which is, for example, configured for 20 insulation mats, is sufficient for one object to be completely fitted out with insulation mats. Thereafter, the gripper has to retract in any case, so that the possibility for restocking exists after the retraction of the gripper, while the next object (motor vehicle, washing machine, etc.) is conveyed to the processing location.

Thus, the grab preferably has a plurality of suction elements. Grabs that have one or more a suction cups are, in principle, known from the prior art and have proven successful for lifting films, mats and also thin sheets. Alternatively or additionally, gripper such as needles or floor grippers, may be used. According to a particular embodiment of the invention, grabs that make the removal operation from the magazine and the placing operation on the workpiece possible simultaneously can be used.

In the simplest case, the magazine is configured as a stacking magazine in which, for example, 20 sheets are stacked on top of one another. Since the stacking magazine is adapted to the size of the sheets, the sheets or other two-dimensional objects in this magazine are also stored with a clear definition in terms of their spatial coordinates, such that incorrect positions can be avoided in a simple manner. Alternatively to this, however, it is likewise possible to configure the magazine as a rolled-up material web from which individual strip-shaped flat objects can be cut by a cutting unit fastened on the grab. If non-rectangular pieces are required, they can also be punched out before the punched-out parts are seized by the grab and removed.

According to a particular embodiment of the manipulator, the grab and the magazine are mounted on a common support plate and configured parallel or at an angle to one another. Preferably, the grab is on the grab head, in particular on the common support plate, such that the grab is rotatable by at least 180°, more preferably by 360°. On account of this configuration it is possible for the grab to remove the flat objects from the magazine from above, subsequently for the arms with the suction cups to be retracted and for the grab to be rotated about an angle of at least 90°, preferably 180°. The surface now freely accessible from the outside of the flat object that is held by suction can be processed, for example by applying a film of adhesive, the grab thereafter transferring the flat object to its destination and, by again extending the suction cup arms, placing the flat object there or fastening it, for example adhesively. If desired, suction units may also be provided in each case on diametrically opposed sides of the grab, such that during the processing or conveying of the first flat object a subsequent flat object is already being removed from the magazine on the other side. However, the resultant greater number of cycles comes at the price of providing an additional suction unit with corresponding controls.

In particular for an application of the manipulator in the automotive industry, the grab has an articulated head that is pivotable about multiple axes, this achieving the desired or else necessary positions of the grab.

A further variant arises when the grab is located on an axle that is telescopically extendable and that carries along the grab in the case of the extension. On account of this, the grab with the held flat object is displaceable to beside or in front of the plane of the magazine, such that the grab can be inserted even into cavities having a small volume on account of the smallest possible interference contour.

The preferably used stacking magazine has a rectangular frame or a rigid or movable shaped piece, a floor plate that can be fixed, and, on the end that faces the floor plate, stops for inserted flat objects. Preferably, the floor plate has at least one spring whose force impinges on inserted flat objects. With this unit, the stack of flat objects is always pressed as far away as possible from the floor of the stacking magazine, such that the topmost flat object, on account of the stop bar, always lies at the same removal position as the previous or subsequent flat object for removal by means of the grab. The manipulator according to the invention is configured such that all functions, namely the removal of the flat object, in particular of the film, if applicable including a blank and an additional application of adhesive, and the attachment to the workpiece, are fulfilled.

Beyond this, the design according to the invention permits the use of robots with slim horizontal arms, such that the insertion of the insulation mats can take place, for example even through the lateral window openings in motor vehicles, or into other cavities with a small volume. The present manipulator makes possible an application of insulation mats that comes very close to the insulating compound injection for motor vehicles, both with respect to the logistics in staging and stocking and with respect to the application of the insulation mats. A largely continuous material flow can be ensured. The daily requirement of flat objects to be transferred or to be processed is secured by containerized stocking, a plurality of individual compartments being contained in one container, from which compartments in each case the required number for filling a magazine, for example 20 flat objects, can be successively removed. When loading the magazine on the manipulator, the required amount in each case is pre-configured in a freely programmable manner, such that flat objects, such as films that have to be processed according to individual type can be exactly applied to the workpiece. On account of the magazine for the stocking of the individual films (insulation mats) being integrated into the manipulator, the application operation, i.e. the application of the films to the workpiece, can be configured as a continuous operation. Here, the films are individually removed from the magazine. Following the removal of the film, the work cycle of the gripper can be executed in the direction of rotation or, optionally, in the longitudinal extension of the grab. In the course of the removal of the film, on account of the design of the magazine and on account of the configuration of the grab (for example, by a suction operation of the individual suction elements that is programmable in its sequence, or by support from needle elements in the gripper or by a mechanical separating apparatus, optionally via a sliding element including a drive roller) it is ensured that only one film is gripped. Additionally, the entire process can be monitored by sensor technology.

When gripping thin material sheets, in particular plastic sheets or plastic films, there is the problem that electrostatic charges and/or the prevalent adhesion of individual sheets complicate the separation of the sheets, because sheets lying on top of one another in stacking magazines sometimes cling to one another. Furthermore, the danger exists in a stacking magazine that, while they are being lifted, the flat objects scrape with their lateral edges along the walls of the stacking magazine and as a result are abraded. In order to counteract these effects, according to a further refinement of the invention, movable hold-downs that act on one side of the topmost flat object and temporarily retain the edge regions while suction cups centrally grip the flat object are used. This causes an upward bending of the flat object, in the course of which the flat object is simultaneously separated and the edge of the flat object is moved away from the side wall of the stacking magazine by the upward bending.

The hold-down apparatus may either consist of at least one roller that is movably guided parallel to the floor plate or a plurality of rollers lying beside one another, preferably on opposite sides, or be configured in the form of pivotally located angle profiles that briefly grip the edges of the flat object before they pivot back and release the corresponding marginal region of the flat object. According to a particular embodiment of the invention, a plurality of angle profiles can be located beside one another and be actuatable such that they pivot away in a temporally offset manner, such that in conjunction with the lifting by the suction caps an additional upward bending occurs both in the longitudinal direction and in the transverse direction of the flat object.

BRIEF DESCRIPTION OF THE DRAWING

The above and other objects, features, and advantages will become more readily apparent from the following description, reference being made to the accompanying drawing in which:

FIG. 1 is a perspective view of a manipulator on an industrial robot;

FIGS. 2, 3, 4a, and 4b are detail views of a combined grab and magazine in various phases of operation;

FIG. 5 is a perspective top view of a magazine for insulation sheets;

FIGS. 9 and 10 are perspective view of two magazines and hold-down devices that together with suction elements interactively work with on flat objects.

SPECIFIC DESCRIPTION OF THE INVENTION

Figure 4A:
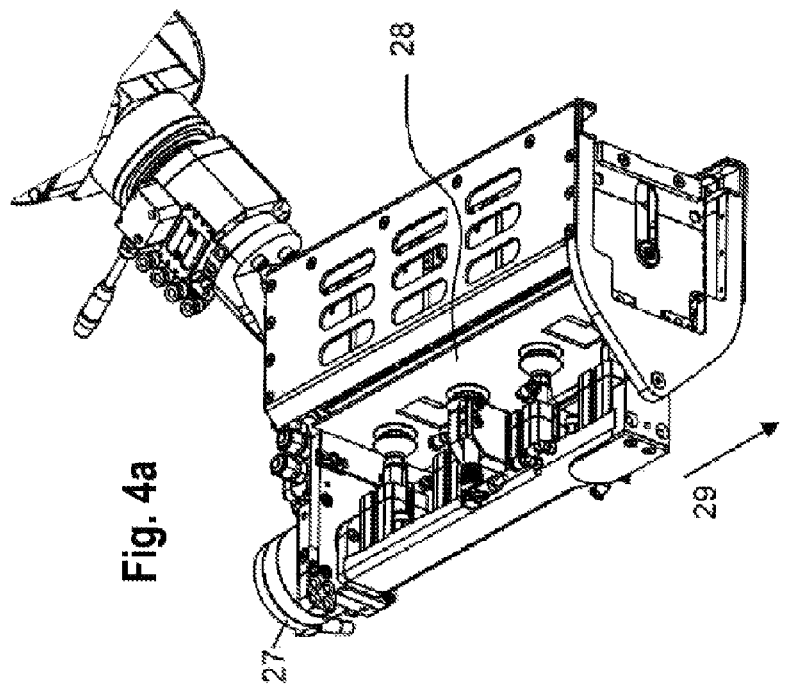

As seen in FIG. 1 an industrial robot has a manipulator 10 formed by a pair of articulated arms 101 and 102 and connected between a base and a tool head 11. This head 11 carries a magazine 12 for holding flat objects and, at a small spacing from it, a grab 13. The magazine 12 and also the grab 13 are mounted on a common support plate 14 and extend parallel to each other perpendicularly therefrom. The grab 13 can pivot through 180° about an axis extending perpendicular to the support plate 14 between end pickup and transfer positions respective facing toward and facing away from the magazine 12. This rotation of the grab 13 on the plate 14 combined with the three-dimensional movement of the manipulator 10 makes it possible for the entire head 11 to move in eight different directions via the provided articulations, such that it is adjustable for all required spatial locations, in particular for the gripping of an insulation mat, the coating of the insulation mat with adhesive, and also for the transfer of the insulation mat to the workpiece, here a motor vehicle interior.

Figure 6:
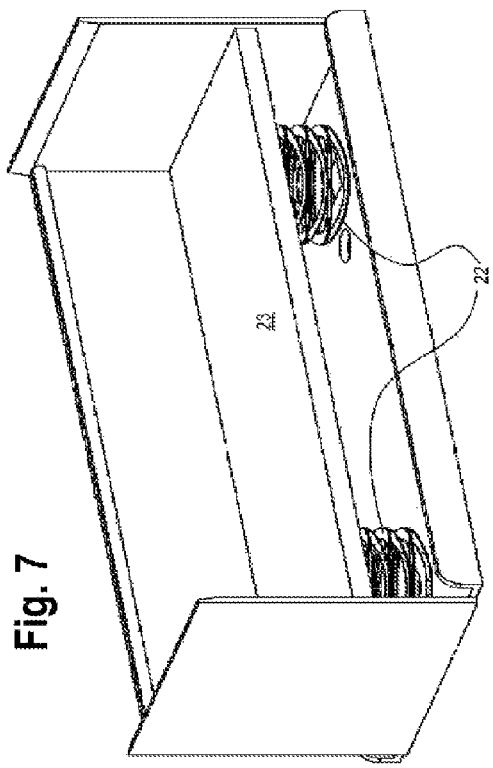
FIG. 6 is a perspective view of a magazine having a closing mechanism for the floor of the magazine.
Figure 7:
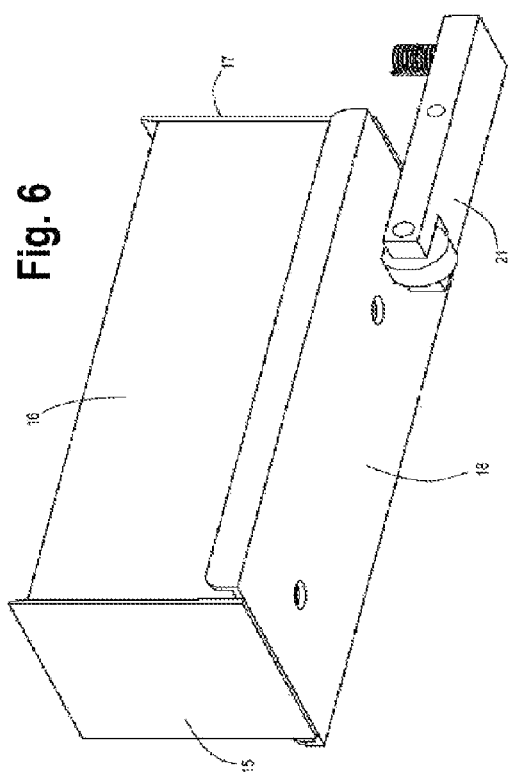
FIG. 7 is a perspective view of a magazine having a spring-loaded floor plate, with some parts removed for clarity of view.

The magazine 12 shown in FIGS. 5 to 7 has four side walls 15 to 17 and a floor 18. The magazine 12 is open toward the top; however, a stop in the form of an inwardly projecting outer edge 19 for the inserted sheets 20 is provided on one side wall 15-17. The magazine 12 here is designed for 20 sheets. The dimension of the magazine is such that the sheets can be inserted with a close fit but with a slight clearance. Depending on the design of the grab 13 and the magazine 12, the sheets 20 may have various sizes, thicknesses, and shapes.

The magazine 12 can be locked with a roller 21. As shown in FIG. 7, springs 22 may in addition be supported on the floor 18 and bear either on the lowermost of the inserted flat objects 20, or on an intermediate floor plate 23 to press the objects 20 upward toward the stop edge 19 and away from the floor 18. This ensures that the inserted flat objects 20 are always positioned such that the topmost flat object 20 bears on the stop 19.

Figure 3:
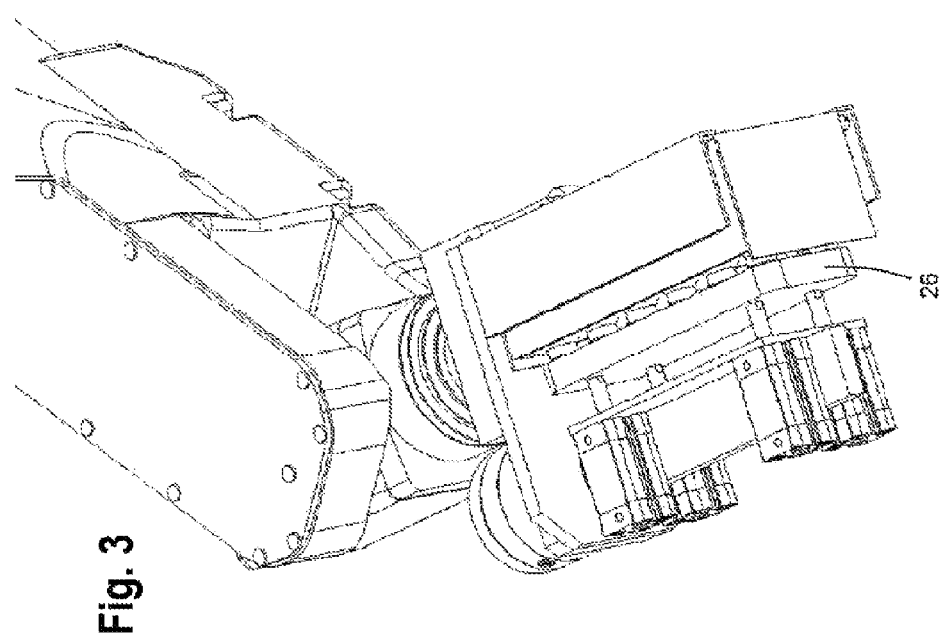

The grab 13 is a suction gripper, known in principle according to the prior art, having an array of parallel plungers 24 arranged next to one another and on whose free ends are suction cups 25 connected to respective vacuum sources or pumps. The plungers 24 here are fastened to a lift plate 26 that, as is evident from a comparison of FIGS. 2 and 3, is movable toward and away from the magazine 12 in the pickup position of the grab 13 facing the magazine 12. When the suction cups 25 move outward in this pickup position from the retracted position of FIG. 2 to the extended position of FIG. 3, they come into contact with the outer face of the flat object 28 lying on top of the stack of objects 20 in the magazine 12. The vacuum source pulls the cups 25 tightly against this outer face. Then, according to controller-commanded operation the lift plate 26 is retracted by an unillustrated actuator so that the uppermost object 20 in the stack is pulled off the stack and out of the magazine 12, with slight bending of the grabbed sheet 20 as it passes the stop edge 19.

Subsequently a drive or actuator 27 rotates the entire grab 13 with the picked-up object 28 about the axis of the grab to the position of FIG. 4b. If necessary this actuator 27 also extends the grab 13 axially as shown by arrow 29. The flat object 28 now lies with its opposite face exposed so that it can, for example, be coated with a curable adhesive by an unillustrated sprayer. This rotation about and movement along the grab axis allows the grab to have the smallest possible interference path so that it can be moved even into a small cavity.

Subsequently, by extending the lifting plate 26, the flat object, which is optionally provided with adhesive, can be pressed against a workpiece where it is to be installed. After fastening or transferring the flat object to its destination, the suction caps are depressurized so that their connection to the grab is broken. The grab can now be rotated by 180°, after which the cycle can be repeated with the next flat object removed and transferred to the next destination or to the next processing stage.

Figure 8:
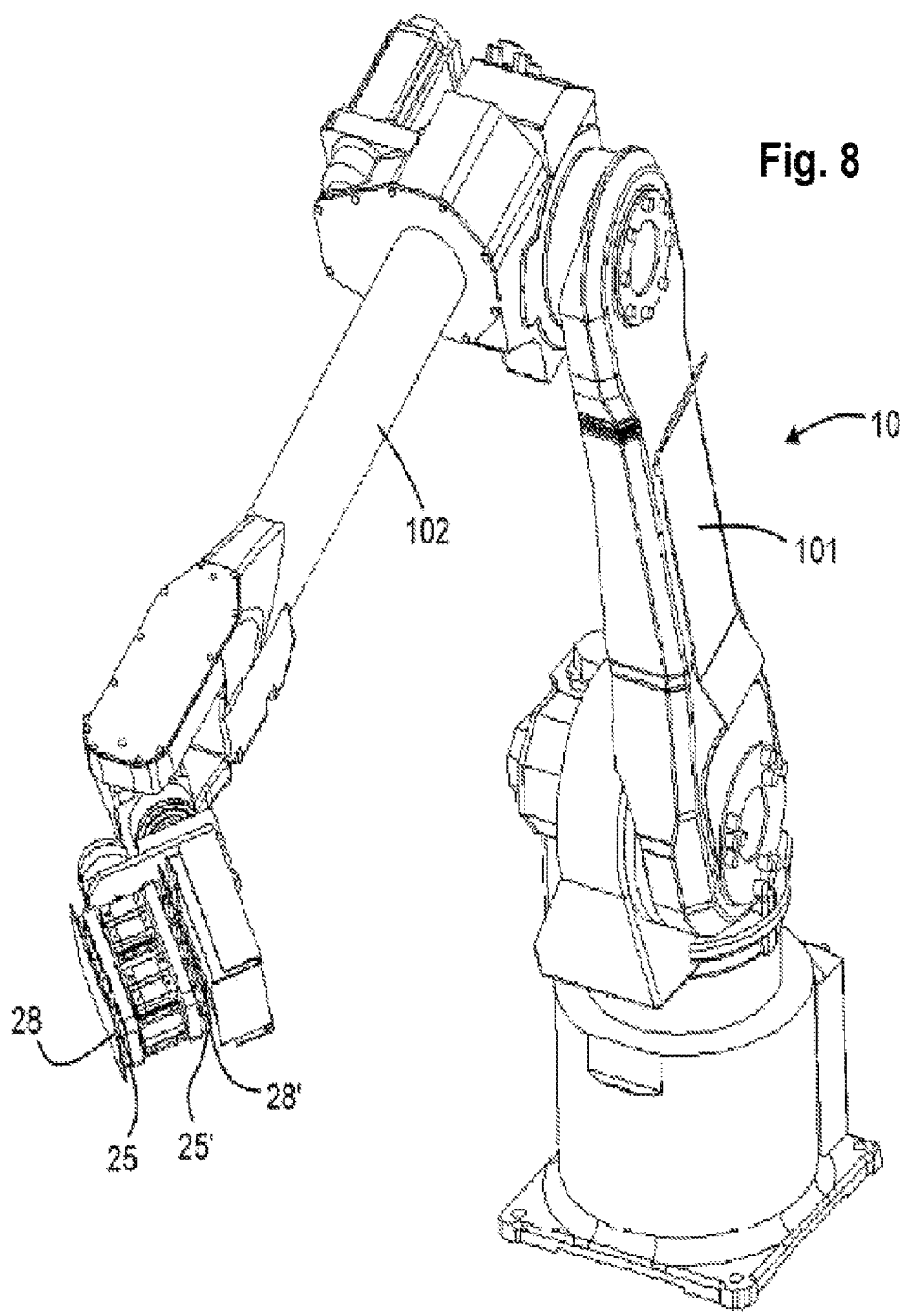
FIG. 8 is a perspective view of an alternative embodiment of the manipulator as in FIG. 1.

Optionally, and as shown in FIG. 8, the grab 13 can also have suction elements 25 and 25' on opposite sides, and these elements can be needles or floor grippers so that, while a flat object 28 is being placed on the workpiece, the next flat object 28' can be removed from the magazine.

The advantage of the manipulator according to the invention particularly is that, depending on what the magazine 12 is holding (in the present case 20 flat objects), the grab can remain in the cavity, in particular the cavity of a motor vehicle, and successively remove and process and also transfer flat objects until all insulation work in the motor vehicle cavity has been completed. Only thereafter, the grab is retracted and the magazine refilled at a container. There is no need for the robot arm to retract the grab 13 from the vehicle to pick up another sheet 20.

In FIG. 9, a magazine 12 and also a grab 13 are visible. Spring elements 22 are provided in the floor plate of the magazine, which spring elements press the stack upwardly away from the floor plate. Additionally to the already described stop edges, or also alternatively to them, a plurality of rollers 29 are provided on at least one lateral edge, the rollers 29 temporarily acting as hold-down apparatuses. While the suction elements are lowered onto the topmost flat object and grip the latter, the rollers 29 block the lifting of the material edge for some time, on account of which an upward bending of the flat object takes place. By pivoting away the rollers 29 from the path of movement, the material edges are released again. The rollers 12 may be located on one side or in each case on opposite sides.

FIGS. 9 and 10 shown a magazine 12' designed to separate flat objects that are likely to cling together, for instance electrostatically. Opposite sides of the magazine 12' are each equipped with a full-length array 29 of rollers carried on upper ends 32 of four pivotal arms 30 and 31. With this system, once the suction cups are clinging to the outer face of the uppermost sheet 28 in the stack, the roller arrays 29 are retracted laterally as the suction cups are pulled back, so that the uppermost sheet 28 will be released along its edges and will slide on the underlying sheet easily, arcing and separating from it.

It is also possible to first pivot back only the two pairs of arms 30 and 31 at the ends so that the ends of the elongated sheet are free to slide, arcing it about a transverse axis, before the two center pairs of arms 30 and 31 are retracted.

I claim:

1. A manipulator for flat objects, the manipulator comprising:
    a pair of relatively articulated robot arms having an outer end;
    a support pivotal on the outer end and movable by the arms about multiple nonparallel axes;
    a magazine holding a stack of the flat objects carried on the support; and
    a grab movable on the support adjacent the magazine between a pickup position facing the stack and engageable with an uppermost flat object of the stack of flat objects in the magazine so as to pull the uppermost flat object off the stack and a transfer position offset from the stack with the picked-up flat object turned away from the magazine.

2. The manipulator defined in claim 1, wherein the grab is pivotal about a grab axis on the support between the pickup and transfer positions.

3. The manipulator defined in claim 2, wherein the grab is movable axially along the grab axis.

4. The manipulator defined in claim 2, wherein the grab has at least one gripper shiftable radially of the axis so as to move toward and away from the magazine in the pickup position.

5. The manipulator defined in claim 4, wherein the gripper is at least one suction cup.

6. The manipulator defined in claim 4, wherein the gripper is an array of suctions cups and the gripper has a common plate to which all the suction cups are attached.

7. The manipulator defined in claim 4, wherein the grab has two such grippers diametrally opposite each other relative to the grab axis such that when one of the grippers is juxtaposed with the magazine in the pickup position the other gripper is turned away from the magazine in the transfer position.

8. The manipulator defined in claim 2, wherein the grab is movable through about 180° between the pickup and transfer positions.

9. The manipulator defined in claim 1, wherein the magazine is a generally parallepipedal box having an open side turned toward the grab and the objects are flat sheets.

10. The manipulator defined in claim 9, wherein the magazine has side walls laterally confining the stack of objects, a floor, and biasing means for urging the stack of objects away from the floor toward toe open side.

11. The manipulator defined in claim 10, further comprising a holddown formation at an outer edge of at least one of the side walls, whereby the objects pass the holddown formation when picked up by the grab.

12. The manipulator defined in claim 11, wherein the holddown formation is an inwardly projecting edge of the one side wall.

13. The manipulator defined in claim 11, wherein the holddown formation is an array of rollers.

14. The manipulator defined in claim 11, wherein the holddown formation is retractable synchronously with movement of the grab.

15. The manipulator defined in claim 11, further comprising pivotal elements on the one side wall carrying the formation.

16. The manipulator defined in claim 15, wherein two of the side walls opposite each other are provided with pivotal elements.

* * * * *